United States Patent [19]
Brookman et al.

[11] Patent Number: 6,037,279

[45] Date of Patent: Mar. 14, 2000

[54] COATED TEXTILE FABRICS

[75] Inventors: Lars Brookman, Stoke-on-Trent; David William Lawson, Canton, both of United Kingdom

[73] Assignee: Dow Corning Limited, Barry, United Kingdom

[21] Appl. No.: 09/038,421

[22] Filed: Mar. 11, 1998

[51] Int. Cl.[7] .................................................. B32B 27/04
[52] U.S. Cl. .............................. 442/71; 442/72; 427/387; 427/389.9; 427/412; 280/728.1
[58] Field of Search ................ 442/71, 72, 387, 442/389.9, 412; 280/728.1

[56] References Cited

U.S. PATENT DOCUMENTS 4,587,159  5/1986  Gutek et al. ............................. 428/251

FOREIGN PATENT DOCUMENTS 0 553 840 A1  8/1993  European Pat. Off. ...... C09D 183/04
0 646 672 A1  4/1995  European Pat. Off. ..... D06M 15/643

*Primary Examiner*—Christopher Raimund
*Attorney, Agent, or Firm*—Arne R. Jarnholm; Richard I. Gearhart

[57] ABSTRACT

A coated textile fabric that has utility for fabricating automobile airbags. A surface of the textile fabric is coated with first and second layers of polyorganosiloxane-based elastomeric material, the first layer being disposed between the textile surface and the second layer. The polyorganosiloxane-based material of the first layer exhibits an elongation-at-break of at least 400%. The polyorganosiloxane-based material of the second layer exhibits a tear-strength of at least 30 kN/m.

22 Claims, No Drawings

COATED TEXTILE FABRICS

The present invention relates to a coated textile fabric, and in particular to a fabric coated with a silicone-based coating composition capable of maintaining a pressure barrier between two areas with a pressure differential. The invention also relates to a process of preparing such textile fabrics and to airbags made with coated fabrics.

Coating textile fabrics with silicone-based coating compositions has been know for a while. These compositions may impart a variety of benefits to the coated fabric. For example in EP 553,840, there is described a liquid silicone rubber coating composition for application to airbags in automobiles, which comprises a certain polydiorganosiloxane having alkenyl groups, an polyorganosiloxane resin, an inorganic filler, a certain polyorganohydrosiloxane, a platinum group metal catalyst and an epoxy group-containing organosilicon compound. In EP 646,672, there is described a fabric impregnated with a silicone composition comprising a certain linear polyorganosiloxane having aliphatic unsaturation, a certain polyorganohydrosiloxane, a catalyst promoting addition reaction, a hydrophobic silica, a flame retardant and optionally an adhesion promoting agent. The latter patent specification suggests the use of the composition for fabrics used in the construction of airbags. The benefit of using silicone-coated compositions over other, e.g. organic coating compositions, lies e.g. in the improved weatherability, ability to maintain flexibility and heat resistance of the silicone-based composition.

While fabrics coated with such compositions may be satisfactory for airbag applications, they do not satisfy requirements where pressurised fluids are to be retained in a fabric envelope for a relatively long period. This requirement exists for example in the application of such coatings to side curtain airbags for the automotive industry. These side curtain airbags are intended to inflate at the time of impact, as do conventional airbags. The side curtains unfold to form a cushioned curtain between passengers and some of the side of the car body, e.g., the windows. As the intention is not merely to cushion the blow on impact itself, as is the case for conventional driver and passenger airbags, but e.g. to protect passengers when a car is rolling, it is important that the side curtain air bag is sufficiently pressurised during such rolling process. Where conventional driver and passenger airbags only need to retain pressure for a fraction of a second, it is desirable that side curtain airbags maintain a suitable pressure for a few seconds. Similar applications exist where a pressurised fabric structure is desired to maintain a certain fluid pressure for a relatively extended period of time, e.g. in emergency chutes for aeroplanes, inflatable rafts etc.

We have found that a combination of certain silicone-based coating compositions can provide these benefits. In particular, we have found that applying multiple layers of silicone-based coating compositions, at least two layers having different characteristics, is very beneficial for such purpose.

Using more than one layer of a silicone based coating is known, and has been disclosed e.g. in U.S. Pat. No. 4,587, 159, where a transparent or translucent silicone coated glass fabric is described, comprising a first layer of polydiorganosiloxane in which the organic radicals are methyl and phenyl radicals in a ratio of from 0.25 to 3.7, impregnating and coating the yarns of the glass fabric but not filling in the interstices of the glass fabric; a second layer of silicone elastomer covering the first layer and filling in the interstices of the glass fabric; and a third layer of elastoplastic polyorganosiloxane resin to give a smooth dry surface. Coated glass fabrics according to that invention are stated as being transparent or translucent and useful for constructing structures such as air-supported and tension-supported roofs for structures such as greenhouses and solar heated buildings. Such materials are however not suitable for the coating of side curtain airbags.

We have now found that by coating a textile fabric with a first layer of a silicone-based elastomer having a high elongation-at-break characteristic, and a second layer of a silicone-based elastomer having a high tear strength, a suitable fabric may be obtained for use as an automotive side curtain airbag.

According to the invention there is provided a coated textile fabric comprising a textile fabric, having at least two layers of an polyorganosiloxane-based elastomeric material, a first layer, coated onto the fabric, having an elongation-at-break of at least 400% and a second layer having a tear-strength of at least 30 kN/m.

According to the invention there is in particular provided a coated textile fabric comprising:

a. a textile fabric presenting at least one surface;

b. said at least one surface being coated with first and second layers of polyorganosiloxane-based elastomeric material;

c. said first layer being disposed between said at least one surface and said second layer;

d. said polyorganosiloxane-based elastomeric material of said first layer exhibiting an elongation-at-break of at least 400%;

e. said polyorganosiloxane-based elastomeric material of said second layer exhibiting a tear-strength of at least 30 kN/m.

Suitable fabrics for use in the present invention are made from synthetic fibres or blends of natural and synthetic fibres, such as polyester, polyimides, polyethylene, polypropylene, polyester-cotton, glass fibre, most preferably polyamide fibres such as Nylon 6,6. They require to be flexible in order to be useful as inflatable bodies. Preferably they are sufficiently flexible to be able to be folded into relatively small volumes, but also sufficiently strong to withstand the deployment at high speed, e.g. under the influence of an explosive charge, and the impact of passengers or other influences when inflated.

The organosiloxane elastomeric materials may be based on a number of organosiloxane systems which form elastomers upon curing. Many such organosiloxane systems are known and commercially available and many have been described in the literature. Suitable elastomer-forming organosiloxane systems comprise at least a siloxane polymer and an organosilicon cross-linker. Useful siloxane polymers have units of the general formula $R_aR'_bSiO_{4-a-b/2}$ (I), wherein R is a monovalent hydrocarbon group having up to 18 carbon atoms, R' is a monovalent hydrocarbon or hydrocarbonoxy group, a hydrogen atom or a hydroxyl group, a and b have a value of from 0 to 3, the sum of a+b being no more than 3. Preferably the siloxane polymers are polyorganosiloxanes of a generally linear nature having the general structure (II)

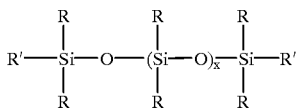

wherein R and R' have the same meaning as above, and wherein x is an integer, preferably having a value of from 10 to 1500. It is particularly preferred that R denotes an alkyl or aryl group having from 1 to 8 carbon atoms, e.g. methyl, ethyl, propyl, isobutyl, hexyl, phenyl or octyl. More preferably at least 50% of all R groups are methyl groups, most preferably substantially all R groups are methyl groups. R' is preferably selected from a hydroxyl group, an alkoxy group, an aliphatically unsaturated hydrocarbon group or a hydrogen atom. More preferably R' denotes either a hydroxyl group or alkoxy group having up to 3 carbon atoms suitable for condensation reactions, or an alkenyl group having up to 6 carbon atoms, more preferably vinyl, allyl or hexenyl, suitable for addition reactions.

Organosilicon cross-linkers are preferably selected from silanes, low molecular weight organosilicon resins and short chain organosiloxane polymers. The cross-linker compound has at least 3 silicon-bonded substituents which are capable of reacting with the silicon-bonded group R' of the polymer described above. Where the group R' is a hydroxyl or alkoxy group, it is preferred that the reactive substituents on the cross-linking organosilicon compound are either alkoxy groups or hydroxyl groups, allowing the condensation to take place between the two components according to the general reaction scheme (III) or (IV), wherein R* denotes an alkyl group

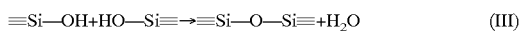   (III)

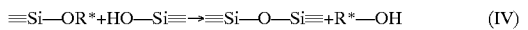   (IV)

Where the group R' in the polymer is an alkenyl group, it is preferred that the reactive substituents R* on the cross-linking organosilicon compound are hydrogen atoms, allowing addition reaction between the cross-linking organosilicon compound and the polyorganosiloxane, according to the general reaction scheme (V), wherein R" is a divalent hydrocarbon group and b is 0 or an integer, preferably with a value of 1.

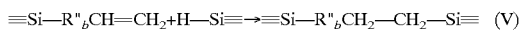   (V)

Suitable silanes which may serve as cross-linking organosilicon compounds include alkyltrialkoxy silane, e.g. methyltrimethoxy silane, ethyltrimethoxy silane, methyltriethoxy silane or methyltrihydrosilane. Suitable organosilicon resin compounds include organosilicon resins consisting mainly of tetrafunctional siloxane units of the formula $SiO_{4/2}$ and monofunctional units $R_v R^o_w Si_{1/2}$, wherein R is as defined above, $R^o$ denotes a silicon-bonded substituent which may react with R' as discussed above, v and w each have a value of from 0 to 3, the sum of v+w being 3. Suitable short chain organosiloxane polymers include short chain polyorganosiloxanes having at least 3 silicon-bonded alkoxy, hydroxyl or hydrogen atoms per molecule, e.g. trimethylsiloxane end-blocked polymethylhydrosiloxane having up to 20 carbon atoms, tetramethylcyclotetrasiloxane and silanol end-blocked dimethylsiloxane-methylsilanol copolymers.

In addition to the siloxane polymers and the organosilicon cross-linking compounds, the elastomer-forming compositions preferably also comprise a suitable catalyst, selected according to the curing or cross-linking mechanism employed. For the preferred silicone based elastomer-forming compositions, which are based on curing by condensation, suitable condensation catalysts include tin or titanium based components, e.g. dialkyltin dicarboxylic acids and tetraalkyl titanates. For those silicone based elastomer-forming compositions which cure by addition reaction, it is preferred to use a Group VIII metal-based catalyst, e.g. platinum chloride, or compounds or complexes of platinum or rhodium.

Other additional components may be included in suitable elastomer-forming compositions, including fillers, chain extenders, dyes, adhesion promoters, colorants, pigments, viscosity modifiers, bath-life extenders, inhibitors and flexibilisers. Suitable fillers include silica, e.g. fumed silica, precipitated silica, gel-formation silica, aerosils, titania, ground quartz, ground cured silicone rubber particles, calcium carbonate and glass microspheres. Preferably the filler has been treated to make its surface hydrophobic where necessary, e.g. by treating with suitable silanes, short chain siloxanes, fatty acids or resinous silicone materials. Suitable materials and processes for rendering the surface of fillers hydrophobic have been described in the literature, and are known to the person skilled in the art. Adhesion promoters include epoxy-functional, organotitanates or amino-functional organosilicon compounds. Chain extenders tend to be organosiloxane materials which are predominantly linear in nature and which have a silicon-bonded group $R^o$ at each end of the polymer, allowing it to react with the R' group of two siloxane polymers, this merely extending the length of the siloxane polymer.

It is preferred that the elastomer-forming compositions are based on organosilicon compounds which cure via the addition reaction. Particularly preferred is a composition which comprises an polyorganosiloxane having at least 2 silicon-bonded alkenyl groups per molecule, preferably vinyl, an organohydrogen cross-linking organosilicon compound, a Group VIII based catalyst and a filler. The ratio of these components in the elastomer-forming compositions are not critical, although it is preferred that the alkenyl-functional polyorganosiloxane polymer and the organosilicon cross-linker having silicon-bonded hydrogen atoms are present in a ratio which will ensure that at least one silicon-bonded hydrogen atom is present per alkenyl group, more preferably that the ratio would be from 1.1/1 to 5/1, most preferably from 2/1 to 4/1.

The first layer (A) is preferably obtained from an elastomer-forming composition which comprises
  (a) 100 parts by weight of a polyorganosiloxane material having on average two silicon-bonded alkenyl groups per molecule, preferably one linked to each of the terminal silicon atoms of the molecule;
  (b) an organosilicon compound having at least three silicon-bonded hydrogen atoms per molecule, in an amount which is sufficient to give a molar ratio of Si—H groups in (b) to alkenyl groups in (a) of from 1.1/1 to 4/1;
  (c) from 1 to 25 parts by weight of a chain extender, comprising an polyorganosiloxane having two silicon-bonded hydrogen atoms;
  (d) a group VIII based catalyst component in sufficient amounts to catalyse the addition reaction between (a) on the one hand and (b) and (c) on the other;
  (e) from 5 to 40 parts by weight of a hydrophobic filler.

The second layer (B) is preferably obtained from an elastomer-forming composition which comprises (a) 100 parts by weight of a polyorganosiloxane material having on average two silicon-bonded alkenyl groups per molecule, preferably one linked to each of the terminal silicon atoms of the molecule;

(b) an organosilicon compound having at least three silicon-bonded hydrogen atoms per molecule, in an amount which is sufficient to give a molar ratio of Si—H groups in (b) to alkenyl groups in (a) of from 1.1/1 to 3/1;

(c) 1 to 25 parts by weight of a polyorganosiloxane material having a silicon-bonded alkenyl group linked to each of the terminal silicon atoms of the molecule and in addition at least one alkenyl group linked to a non-terminal silicon atom in the polyorganosiloxane chain;

(d) a group VIII based catalyst component in sufficient amounts to catalyse the addition reaction between (a) on the one hand and (b) and (c) on the other;

(e) from 5 to 40 parts by weight of a hydrophobic filler.

More preferably polyorganosiloxane (A)(a) and (B)(a) is a polydiorganosiloxane having the general formula (IV)

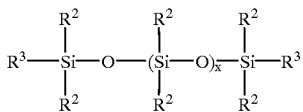

where $R^2$ denotes a monovalent hydrocarbon having up to 16 carbon atoms, preferably an alkyl or aryl group having up to 8 carbon atoms, more preferably a lower alkyl having up to 6 carbon atoms, most preferably methyl, $R^3$ denotes a group having aliphatic unsaturation and having the general formula $—R^4_y—CH=CH_2$, where $R^4$ denotes a divalent hydrocarbon group having up to 6 carbon atoms, preferably an alkylene group having up to 4 carbon atoms, y has a value of 0 or 1, and x has a value of from 0 to 1500, preferably 50 to 1200, most preferably 70 to 800. It is most preferred that polydiorganosiloxane (A)(a) and (B)(a) is an α,ω-vinyldimethylsiloxy polydimethylsiloxane polymer having a viscosity of from 50 to 250,000 mPa.s at 25° C., more preferably 100 to 100,000 mPa.s, most preferably 250 to 55,000 mPa.s.

Organosilicon component (A)(b) and (B)(b) is preferably a short chain polyorganosiloxane having at least 3 silicon-bonded hydrogen atoms, preferably having a silicon-bonded hydrogen atom on the majority of silicon atoms in the molecule. Particularly preferred are organosilicon compounds which are substantially linear or cyclic compounds. However, small amounts of trifunctional or tetrafunctional siloxane units may also be present.

Preferred compounds for (A)(b) and (B)(b) are organosilicon compounds having the general formula

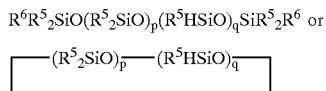

wherein $R^5$ denotes an alkyl or aryl group having up to 10 carbon atoms, $R^6$ is a group $R^5$ or a hydrogen atom, p has a value of from 0 to 20, q has a value of from 1 to 70, and there are at least 3 silicon-bonded hydrogen atoms present per molecule. It is not important if the silicon-bonded hydrogen atoms are on terminal silicon atoms for linear siloxane compounds or not. It is preferred that $R^5$ denotes a lower alkyl group having no more than 3 carbon atoms, most preferably a methyl group. $R^6$ preferably denotes an $R^5$ group. Preferably p=0 and q has a value of from 6 to 70, more preferably 20 to 60, or where cyclic organosilicon materials are used, from 3 to 8. The cross-linking component may comprise a mixture of several organosilicon compounds as described.

The amount of cross-linking component (A)(b) or (B)(b) which is used in a composition is preferably sufficient to provide at least a ratio of the number of silicon-bonded hydrogen atoms over the number of alkenyl groups in the composition of about 1/1, i.e. in stoichiometric amounts. It is however, more preferred to have some stoichiometric excess of SiH groups present to ensure complete cross-linking of the composition. Preferred SiH/alkenyl ratios are from 1.1/1 to 5/1, more preferably 2/1 to 4/1.

Component (A)(d) and (B)(d) is a catalyst which is suitable for promoting the addition reaction of alkenyl groups with silicon-bonded hydrogen atoms. Suitable catalysts are accordingly those based on precious metals, particularly Group VIII metals, including ruthenium, rhodium, palladium, osmium, iridium and platinum. Preferably the catalyst is a well-known platinum compound or complex. Suitable platinum compounds and complexes include chloroplatinic acid, platinum acetylacetonate, complexes of platinous halides with unsaturated compounds such as ethylene, propylene, organovinylsiloxanes, and styrene, hexamethyldiplatinum, PtCl2, PtCl3, PtCl4, and Pt(CN)3. The preferred platinum catalyst is a form of chloroplatinic acid, either as the commonly available hexa-hydrate form or in its anhydrous form, as taught in U.S. Pat. No. 2,823,218. Another particularly useful catalyst is the composition that is obtained when chloroplatinic acid is reacted with an aliphatically unsaturated organosilicon compound such as divinyltetramethyl-disiloxane, as disclosed in U.S. Pat. No. 3,419,593. It is preferred that catalyst (A)(d) or (B)(d) is employed in an amount giving from 2 to 100 ppm by weight of platinum metal based on the total weight of the total composition, more preferably 5 to 50ppm.

Hydrophobic filler (A)(e) and (B)(e) is preferably a reinforcing filler. Examples of suitable fillers include silica, titania, ground quartz, calcium carbonate and alumino silicates. Preferred are silica fillers, most preferably fumed silica fillers, as they have the best reinforcing properties. The average particle size of these fillers may be such that the diameter ranges form 0.1 to 20 Tm, preferably from 0.2 to 5 Tm, most preferably 0.4 to 2.5 Tm.

The surface of the filler particles is rendered hydrophobic in order to make the filer more compatible with the compositions used in the present invention. Rendering the filler particles hydrophobic may be done either prior to or after dispersing the filler particles in the siloxane component. This can be effected by pre-treatment of the filler particles with fatty acids, reactive silanes or reactive siloxanes. Examples of suitable hydrophobing agents include stearic acid, dimethyldichlorosilane, trimethylchlorosilane, hexamethyldisilazane, hydroxyl endblocked or methyl endblocked polydimethylsiloxanes, siloxane resins or mixtures of two or more of these. Other hydrophobing agents may also be used, but the above exemplified materials are the most effective. Fillers which have already been treated with such compounds are commercially available from a number of sources. Alternatively, the surface of the filler may be rendered hydrophobic in situ, i.e. after the filler has been dispersed in the siloxane material. This may be effected by adding to the polysiloxane component prior to, during or after the dispersion of the filler, an appropriate amount of a hydrophobing agent of the kind described above as reactive silanes or siloxanes, and heating the mixture sufficiently to cause reaction, e.g. a temperature of at least 40° C. The quantity of hydrophobing agent to be employed will depend for example on the nature of the agent and of the filler, and will be evident or ascertainable by those skilled in the art. Sufficient hydrophobic agent should be employed to endow the filler with at least a discernible degree of hydrophobicity.

Component (A)(c) is a polyorganosiloxane preferably having diorganosiloxane units and hydrodiorgano siloxane end-blocking units. Because of the nature of these polymers, they serve as chain-extenders, adding to an alkenyl group of (A)(a) upon curing. Preferably these polymers have a viscosity which is in the range of from 5 to 100 mPa.s at 25° C.

Component (B)(c) is a polyorganosiloxane material having a silicon-bonded alkenyl group linked to each of the terminal silicon atoms of the molecule and in addition at least one alkenyl group linked to a non-terminal silicon atom in the polyorganosiloxane chain. Such materials are similar to the siloxane materials (B)(a) described above. The main difference that the preferred materials have in addition to an alkenyl group linked to siloxane units which are terminal to the molecule, that at least one more alkenyl group is present linked to a silicon atom in the siloxane chain. Preferably the polyorganosiloxane is a copolymer of dialkylsiloxane units and alkenylalkylsiloxane units, which are end-blocked by alkenyldialkylsiloxane units. More preferably the copolymer is a vinyldimethyl siloxane end-blocked dimethylsiloxane vinylmethylsiloxane copolymer having about 1 to 5 mole % vinyl groups per molecule. Most preferred copolymers (B)(c) have a viscosity of from 150 to 600 mPa.s at 25° C.

Compositions (A) and (B) may be made by merely mixing the ingredients in the desired ratios. However, for reasons of storage stability and bath life before or during application of the compositions to the textile fabric, it is preferred to store each of the compositions in two parts, by separating the catalyst (d) from the Si-H functional materials [i.e. (A)(b), (A)(c) and (B)(c)]. The other components of the compositions are often distributed over both parts in proportions which will allow easy mixing of the two parts immediately prior to application. Such easy mixing ratios may be e.g. 1/10 or 1/1 ratios.

Composition (A) has to have a very good elongation-at-break characteristic, when tested as a self-supporting elastomeric material. This is a well-known property of elastomeric materials and a person skilled in the art will be able to determine this characteristic with known techniques, e.g. DIN standard 53409. It is preferred that the elongation at break is from 600 to 1000%. Preferred compositions have from 50 to 90% by weight of component (A)(a), from 0.5 to 10% by weight of component (A)(b), from 0.5 to 10% by weight of component (A)(c), from 5 to 40% by weight of component (A)(e) and sufficient of component (A)(d) to ensure the addition reaction of (A)(a) to (A)(b) and (A)(c) takes place under normal curing conditions.

Composition (B) has to have a very good tear strength characteristic, when tested as a self-supporting elastomeric material. This is a well-known property of elastomeric materials and a person skilled in the art will be able to determine this characteristic with known techniques, e.g. ASTM D624 B. It is preferred that the tear strength is from 35 to 60 kN/m. Preferred compositions have from 50 to 90% by weight of component (B)(a), from 0.5 to 10% by weight of component (B)(b), from 0.5 to 10% by weight of component (B)(c), from 5 to 40% by weight of component (B)(e) and sufficient of component (B)(d) to ensure the addition reaction of (B)(a) and (B)(c) to (B)(b) takes place under normal curing conditions.

The compositions may be applied according to known techniques to the textile fabric substrates. These include spraying, coating by knife-over-roller, coating by knife-over-air, padding and screen-printing. It is preferred that each of the compositions are applied to a coat-weight prior to curing of at least 20 g/m². Preferably the coating thickness of the first layer is from 25 to 70g/m², more preferably 30 to 50 g/m². The second layer is preferably applied at a thickness of from 35 to 150 g/m², more preferably 50 to 100 g/m². In order to make the compositions easily applicable to the textile fabric, it is preferred that the viscosity of composition (A) is from 50,000 to 200,000 mPa.s, and that of composition (B) from 80,000 to 300,000 mPa.s.

Application to the textile fabric of Composition (A) may take place under normal conditions, preferably of course the conditions are sufficiently clean to avoid entrapment of foreign bodies during the application. The textile fabric is preferably scoured prior to application, in order to ensure good adhesion of the composition. Composition (B) may be applied on top of Composition (A) prior to or following curing of Composition (A). Preferably composition (A) is cured prior to application of composition (B), which is cured subsequently. It is however possible that between compositions (A) and (B) there is applied one or more additional organosilicon-based elastomeric compositions, preferably of elongation-at-break and tear-strength characteristics in between those of compositions (A) and (B). Most preferably, however, Composition (B) is applied directly onto Composition (A). It is also possible to apply onto Composition (B) a further coating, e.g. of a material providing low friction, or, even more preferably, an additional textile fabric, whether woven or non-woven, to improve the strength and/or the feel of the fabric.

Curing conditions for compositions (A) and (B) are preferably at elevated temperatures over a period which will vary depending on the actual temperature used.

Suitable curing conditions for the preferred compositions are 120 to 200° C. for a period of up to 5 minutes.

According to the invention there is also claimed a process for coating textile fabric with a first layer of an polyorganosiloxane-based elastomeric material having a elongation-at-break of at least 400% and a second layer, having a tear-strength of at least 30 kN/m, and causing the first and second layer to cure to form an elastomeric coating on the fabric.

Preferably the first layer is applied and caused to be cured prior to the application of the second layer to the first, although it is possible to apply the second layer onto the first and causing both layers to cure at the same time.

The advantage of the combination of the two layers of coating on the surface of a textile fabric is that the fabric becomes much more able to form a barrier between areas of differing pressure. Particularly useful applications for textile fabrics coated according to the present invention are those applications where the fabric is formed into an envelope and pressure is applied inside the envelope, e.g. by introducing gas into the envelope and thus inflating it. Particularly useful applications include automotive airbags, emergency shoots on aeroplanes, hot air balloons. The most valuable use of fabrics according to the invention is in the production of side curtain airbags for automobiles, where the internal pressure of the envelope needs to be maintained for a relatively long period of time, e.g. from 1 to 5 seconds.

The following examples, where parts and percentages are given in weight, unless otherwise stated and where viscosity is dynamic viscosity at 25° C., illustrate the invention.

EXAMPLES

A first composition (I) was prepared by mixing together 70 parts of an α,ω-vinyldimethylsiloxane end-blocked polydimethylsiloxane having a viscosity of about 2Pa.s, 30 parts of a fumed silica which had its surface made hydrophobic and 0.002 parts by weight of a platinum based catalyst. Composition (I) had a viscosity of 100 Pa.s.

A second composition (II) was prepared, containing 64 parts by weight of an α,ω-vinyldimethylsiloxane end-blocked polydimethylsiloxane having a viscosity of 2 Pa.s, 26 parts by weight of a fumed silica which had its surface made hydrophobic, 4 parts by weight of an methylhydrosiloxane dimethylsiloxane copolymer having trimethylsiloxane end-blocking units, at least 3 silicon-bonded hydrogen atoms per molecule and a viscosity of about 5 mPa.s and 5 parts by weight of a dimethylsiloxane having dimethylhydrosiloxane and-blocking units and a viscosity of about 10 mPa.s. Composition (II) had a viscosity of 100 Pa.s.

A third composition (III) was prepared containing 64 parts of an α,ω-vinyldimethylsiloxane end-blocked polydimethylsiloxane having a viscosity of about 55Pa.s, 25 parts of a fumed silica which had its surface made hydrophobic, 0.002 parts by weight of a platinum based catalyst, and 9 parts of a dimethylsiloxane methylvinylsiloxane copolymer having vinyldimethylsiloxane end-blocking units and a viscosity of about 3500mPa.s. Composition (III) had a viscosity of 175 Pa.s.

A fourth composition (IV) was prepared by mixing together 61 parts of an α,ω-vinyldimethylsiloxane end-blocked polydimethylsiloxane having a viscosity of about 55 Pa.s, 25 parts of a fumed silica which had its surface made hydrophobic, 3 parts by weight of an methylhydrogensiloxane dimethylsiloxane copolymer having trimethylsiloxane end-blocking units, at least 3 silicon-bonded hydrogen atoms per molecule and a viscosity of about 5 mPa.s and 9 parts of a dimethylsiloxane methylvinylsiloxane copolymer having vinyldimethylsiloxane end-blocking units and a viscosity of about 350 mPa.s. Composition (IV) had a viscosity of 175 Pa.s.

A comparative elastomer-forming composition (C) was prepared by mixing 5 parts of a first composition comprising 64 parts of a 70/30 mixture of a dimethylvinylsiloxy-terminated polydimethylsiloxane and hydrophobic silica, 26 parts of ground quartz, 4 parts of calcium carbonate and a catalytic amount of a platinum based catalyst and 1 part of a second composition comprising 50 parts of a 70/30 mixture of a dimethylvinylsiloxy-terminated polydimethylsiloxane and hydrophobic silica, 46 parts of a dimethylsiloxane methythydrogen siloxane copolymer having silicon-bonded hydrogen atoms on about 50% of the silicon atoms.

Example 1

A double layered polyamide fabric of 470 Dtex was made into side curtain master batch (containing envelopes of the fabric woven into that fabric structure) coated on both sides of the fabric by a knife over roller technique with a 50/50 elastomer-forming mixture of compositions (I) and (II) to a coat weight of 50–60 g/m², followed by heating the coated fabric for 2 minutes at 150–170° C. After allowing the coated fabric to cool to room temperature, a second coating was applied on top of the first coating using a 50/50 elastomer-forming mixture of Compositions (III) and (IV), to a coat weight of 100 g/m², after which the coated fabric was reheated as before. This resulted in a coated fabric having two layers of a silicone-based coat, the first layer having an elongation-at-break (when tested as a self-supporting elastomeric material) of more than 600%, and a second layer having a tear strength (when tested as a self-supporting elastomeric material) of 45–50 kN/m.

The fabric was then cut to give closed envelope side curtain airbags of 2 metre by 0.5 metre dimensions, having an entry point, through which the envelope was inflated with air under explosive conditions to a pressure of 250 kPa. The pressure in the sealed envelope was then measured after 3 seconds and after 5 seconds. In addition the leakage rate was derived from the pressure change vs. time, and is measured in kPa/s/bar. Better performance is indicated by lower leakage rates and higher residual pressures. Details of the test results are given below in Table I.

Comparative Example C1–C5

All examples were carried out according to the process of Example 1, except that in some cases only one coat of silicone material was coated onto the fabric. In Comparative Example C1, Composition C was coated at a coat weight of 70 g/m²; in Comparative Example C2, a mixture of Compositions (III) and (IV) was coated at a coat weight of 50–70 g/m²; in Comparative Example C3 two layers of the coat applied in Comparative Example C2 were applied; in Comparative Example C4, a base coat according to Example C1 was applied and a top layer according to Comparative Example C2; in Comparative Example C5, a base coat according to Example 1 was applied, and a top coat according to Comparative Example C1. Test results are also given in Table I below.

TABLE I

| Example | Leakage rate kPa/s/bar | Residual pressure after 3 seconds | Residual pressure after 5 seconds |
| --- | --- | --- | --- |
| 1  | 8   | 180 kPa | 70 kPa |
| C1 | 600 | N/D     | N/D    |
| C2 | 150 | N/D     | N/D    |
| C3 | 133 | N/D     | N/D    |
| C4 | 90  | 20 kPa  | N/D    |
| C5 | N/A | N/D     | N/D    | where N/D means that the value was so low it was not detectable, and N/A means the calculation was not done.

Examples 2–5

Polyamide fabric was coated with compositions as in Example 1, except for the fact that the envelopes were only the A4 size. Example 2 used the same composition and coat weights as Example 1, in Example 3 the second layer was only applied at a coat weight of 50 g/m², in Example 4 the first layer was coated at 100 g/m² and the second layer at 50 g/m² and in Example 5 for both layers were coated at 100 g/m². The envelopes were subsequently tested in the same way as those of Example 1, except that no leakage rates were calculated. Test results are given in Table II below, but because of the different size of the envelopes, the results cannot be compared with those given in Table I.

Comparative Examples 6–7

Polyamide fabric was coated as for Examples 2 to 4, with the difference that in Comparative Example C6, a coating according to Comparative Example C1 was applied at a coat weight of 100 g/m² and in Comparative Example C7, Composition C was applied at a coat weight of 150 g/m². The envelopes were tested in the same way as Example 1, but no leakage ratios were calculated. Results are given in Table II.

TABLE II

| Example | Residual pressure after 3 seconds | Residual pressure after 5 seconds |
|---------|-----------------------------------|-----------------------------------|
| 2       | 100 kPa                           | 70 kPa                            |
| 3       | 30 kPa                            | 10 kPa                            |
| 4       | 30 kPa                            | 10 kPa                            |
| 5       | 120 kPa                           | 100 kPa                           |
| C6      | N/D                               | N/D                               |
| C7      | N/D                               | N/D                               | where N/D denotes the pressure was so low that it could not be detected.

That which is claimed is:

1. A coated textile fabric comprising
   a. a textile fabric presenting at least one surface;
   b. said at least one surface being coated with first and second layers of polyorganosiloxane-based elastomeric material;
   c. said first layer being disposed between said at least one surface and said second layer;
   d. said polyorganosiloxane-based elastomeric material of said first layer exhibiting an elongation-at-break of at least 400%;
   e. said polyorganosiloxane-based elastomeric material of said second layer exhibiting a tear-strength of at least 30 kN/m.

2. A coated textile fabric according to claim 1, wherein the textile fabric is made from polyamide fibres.

3. A coated textile fabric according to claim 1, wherein the first layer has an elongation-at-break from 600 to 1000%.

4. A coated textile fabric according to claim 1, wherein the second layer has a tear strength from 35 to 60 kN/m.

5. A coated textile fabric according to claim 1, wherein the second layer is located directly on the first layer.

6. A coated textile fabric according to claim 1, wherein the first elastomer-forming composition (A) comprising
   (a) 100 parts by weight of a polyorganosiloxane material having on average two silicon-bonded alkenyl groups per molecule;
   (b) an organosilicon compound having at least three silicon-bonded hydrogen atoms per molecule, in an amount which is sufficient to give a molar ratio of Si—H groups in (b) to alkenyl groups in (a) of from 1.1/1 to 5/1;
   (c) from 1 to 25 parts by weight of a chain extender, comprising an polyorganosiloxane having two silicon-bonded hydrogen atoms;
   (d) a group VIII metal based catalyst component in sufficient amounts to catalyse the addition reaction between (a) on the one hand and (b) and (c) on the other;
   (e) from 5 to 40 parts by weight of a hydrophobic filler.

7. A coated textile fabric according to claim 1, wherein the second layer of polyorganosiloxane-based elastomeric material is made from elastomer-forming composition (B) comprising
   (a) 100 parts by weight of a polyorganosiloxane material having on average two silicon-bonded alkenyl groups per molecule, preferably one linked to each of the terminal silicon atoms of the molecule;
   (b) an organosilicon compound having at least three silicon-bonded hydrogen atoms per molecule, in an amount which is sufficient to give a molar ratio of Si—H groups in (b) to alkenyl groups in (a) of from 1.1/1 to 5/1;
   (c) 1 to 25 parts by weight of a polyorganosiloxane material having a silicon-bonded alkenyl groups linked to each of the terminal silicon atoms of the molecule and in addition at least one alkenyl group linked to a non-terminal silicon atom in the polyorganosiloxane chain;
   (d) a group VIII metal based catalyst component in sufficient amounts to catalyse the addition reaction between (a) on the one hand and (b) and (c) on the other and
   (e) from 5 to 40 parts by weight of a hydrophobic filler.

8. A process for coating a textile fabric with comprises a first step of applying a first polyorganosiloxane-based elastomer-forming composition, which forms, upon curing, an elastomeric material having an elongation-at-break of at least 400%, to the textile fabric, a second step of applying a second polyorganosiloxane-based elastomer-forming composition, which, upon curing, forms an elastomeric material having a tear-strength of at least 30 kN/m, and a third step of causing the first and second polyorganosiloxane-based elastomer-forming composition to cure to form an elastomeric coating on the fabric.

9. A process according to claim 8, wherein each of first and second elastomer-forming compositions comprises a polyorganosiloxane having at least 2 silicon-bonded alkenyl groups per molecule, an organohydrogen cross-linking organosilicon compound, a Group VIII metal based catalyst and a filler.

10. A process according to claim 9, wherein in first and second elastomer-forming compositions the ratio of silicon-bonded hydrogen atoms to alkenyl groups is from 1.1/1 to 5/1.

11. A process according to claim 8, wherein the first elastomer-forming composition (A) used to form the first layer comprises
   (a) 100 parts by weight of a polyorganosiloxane material having on average two silicon-bonded alkenyl groups per molecule;
   (b) an organosilicon compound having at least three silicon-bonded hydrogen atoms per molecule, in an amount which is sufficient to give a molar ratio of Si—H groups in (b) to alkenyl groups in (a) of from 1.1/1 to 5/1;
   (c) from 1 to 25 parts by weight of a chain extender, comprising an polyorganosiloxane having two silicon-bonded hydrogen atoms;
   (d) a group VIII metal based catalyst component in sufficient amounts to catalyse the addition reaction between (a) on the one hand and (b) and (c) on the other;
   (e) from 5 to 40 parts by weight of a hydrophobic filler.

12. A process according to claim 8, wherein the second elastomer-forming composition (B) used to form the second layer comprises
   (a) 100 parts by weight of a polyorganosiloxane material having on average two silicon-bonded alkenyl groups per molecule, preferably one linked to each of the terminal silicon atoms of the molecule;
   (b) an organosilicon compound having at least three silicon-bonded hydrogen atoms per molecule, in an amount which is sufficient to give a molar ratio of Si—H groups in (b) to alkenyl groups in (a) of from 1.1/1 to 5/1;
   (c) 1 to 25 parts by weight of a polyorganosiloxane material having a silicon-bonded alkenyl groups linked to each of the terminal silicon atoms of the molecule and in addition at least one alkenyl group linked to a non-terminal silicon atom in the polyorganosiloxane chain;

(d) a group VIII metal based catalyst component in sufficient amounts to catalyse the addition reaction between (a) on the one hand and (b) and (c) on the other and (e) from 5 to 40 parts by weight of a hydrophobic filler.

13. A process according to claim 11, wherein polyorganosiloxane (A)(a) is a polydiorganosiloxane having the general formula

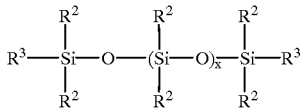

where $R^2$ denotes a monovalent hydrocarbon having up to 16 carbon atoms, $R^3$ denotes a group having aliphatic unsaturation and having the general formula $-R^4_y-CH=CH_2$, where $R^4$ denotes a divalent hydrocarbon group having up to 6 carbon atoms, y has a value of 0 or 1, and x has a value of from 0 to 1500.

14. A process according to claim 12, wherein polyorganosiloxane (B)(a) is a polydiorganosiloxane having the general formula

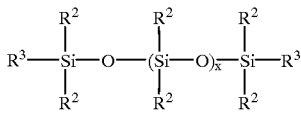

where $R^2$ denotes a monovalent hydrocarbon having up to 16 carbon atoms, $R^3$ denotes a group having aliphatic unsaturation and having the general formula $-R^4_y-CH=CH_2$, where R" denotes a divalent hydrocarbon group having up to 6 carbon atoms, y has a value of 0 or 1, and x has a value of from 0 to 1500.

15. A process according to claim 11, wherein organosilicon compound (A)(b) has the general formula $R^6R^5{}_2SiO(R^5{}_2SiO)_p(R^5HSiO)_qSiR^5{}_2R^6$ or

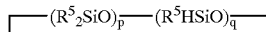

wherein $R^5$ is selected from the group consisting of alkyl having up to 10 carbon atoms and aryl having up to 10 carbon atoms, R' is selected from the group consisting of alkyl having up to 10 carbon atoms, aryl having up to 10 carbon atoms and hydrogen, p has a value of from 0 to 20, q has a value of from 1 to 70, and there are at least 3 silicon-bonded hydrogen atoms present per molecule.

16. A process according to claim 14, wherein organosilicon compound (B)(b) has the general formula $R^6R^5{}_2SiO(R^5{}_2SiO)_p(R^5HSiO)_qSiR^5{}_2R^6$ or

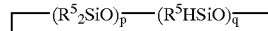

wherein $R^5$ is selected from the group consisting of alkyl having up to 10 carbon atoms and aryl having up to 10 carbon atoms, $R^6$ is selected from the group consisting of alkyl having up to 10 carbon atoms, aryl having up to 10 carbon atoms and hydrogen, p has a value of from 0 to 20, q has a value of from 1 to 70, and there are at least 3 silicon-bonded hydrogen atoms present per molecule.

17. A process according to claim 11, wherein hydrophobic filler (A)(e) comprises a fumed silica filler, the surface of which is rendered hydrophobic by treatment of the filler particles with a compound selected from the group consisting of fatty acids, reactive silanes and reactive siloxanes.

18. A process according to claim 12, wherein hydrophobic filler (B)(e) comprises a fumed silica filler, the surface of which is rendered hydrophobic by treatment of the filler particles with a compound selected from the group consisting of fatty acids, reactive silanes and reactive siloxanes.

19. A process according to claim 8, wherein the elastomer-forming composition is applied to the textile fabric substrates by a method selected from the group consisting of spraying, coating by knife-over-roller, coating by knife-over-air, padding and screen-printing to a coat-weight prior to curing of at least 20 g/m².

20. A process according to claim 8, wherein the coating thickness of the first layer when applied is from 25 to 70 g/m², and of the second layer from 35 to 150 g/m².

21. A process according to claim 8, wherein the first layer is cured prior to application of the second layer, which is itself cured subsequently, both layers being cured at a temperature of from 120° C. to 200° C.

22. An automotive airbag, made from coated textile fabric comprising a textile fabric according to claim 1.

* * * * *